US006135461A

United States Patent [19]

Below et al.

[11] Patent Number: 6,135,461

[45] Date of Patent: Oct. 24, 2000

[54] CHUCK FOR DRILLING AND CHISELING TOOLS

[75] Inventors: Armin Below, Kaufering; Uto Plank, Freising; Erwin Manschitz, Germering; Josef Anzinger, Munich; Harald Geiger, Kaufering, all of Germany

[73] Assignee: Hilti Aktiengesellschaft, Schaan, Liechtenstein

[21] Appl. No.: 09/360,743

[22] Filed: Jul. 26, 1999

[30] Foreign Application Priority Data

Jul. 31, 1998 [DE] Germany ............................ 198 34 503

[51] Int. Cl.[7] ............................ B23B 31/103; B23B 45/16

[52] U.S. Cl. ............................ 279/19.4; 279/24; 279/38; 279/906

[58] Field of Search ............................ 279/19, 19.4, 24, 279/35, 38, 906; 408/239 R, 240

[56] References Cited

U.S. PATENT DOCUMENTS 2,432,144 12/1947 Elkins .................................... 279/19.4
5,954,347 9/1999 Buck et al. ................................ 279/82

FOREIGN PATENT DOCUMENTS 2961279 5/1998 Germany .

*Primary Examiner*—Steven C. Bishop
*Attorney, Agent, or Firm*—Brown & Wood, LLP

[57] ABSTRACT

A chuck for drilling and chiseling tools and including a receiving sleeve at least one through-opening formed in a sleeve wall at least one locking member supported for a limited pivotal movement about a pivot axis, which extends substantially perpendicular to a longitudinal axis of the receiving sleeve, and projecting at least partially into the through-opening (12) of the sleeve with the locking member (6) extending in its locking position through the through-opening (12) into a receiving sleeve inferior, a guide ring surrounding the receiving sleeve and at least partially overlapping the locking member (6) in its locking position, preventing the locking member (6) from pivoting into its release position and an actuation sleeve (7) displaceable in a direction opposite to an operational direction of the tool against a spring-biasing force for enabling pivoting of the locking member (6) into the release position, with the locking member (6) being pivotally connected with the actuation sleeve (7).

6 Claims, 1 Drawing Sheet

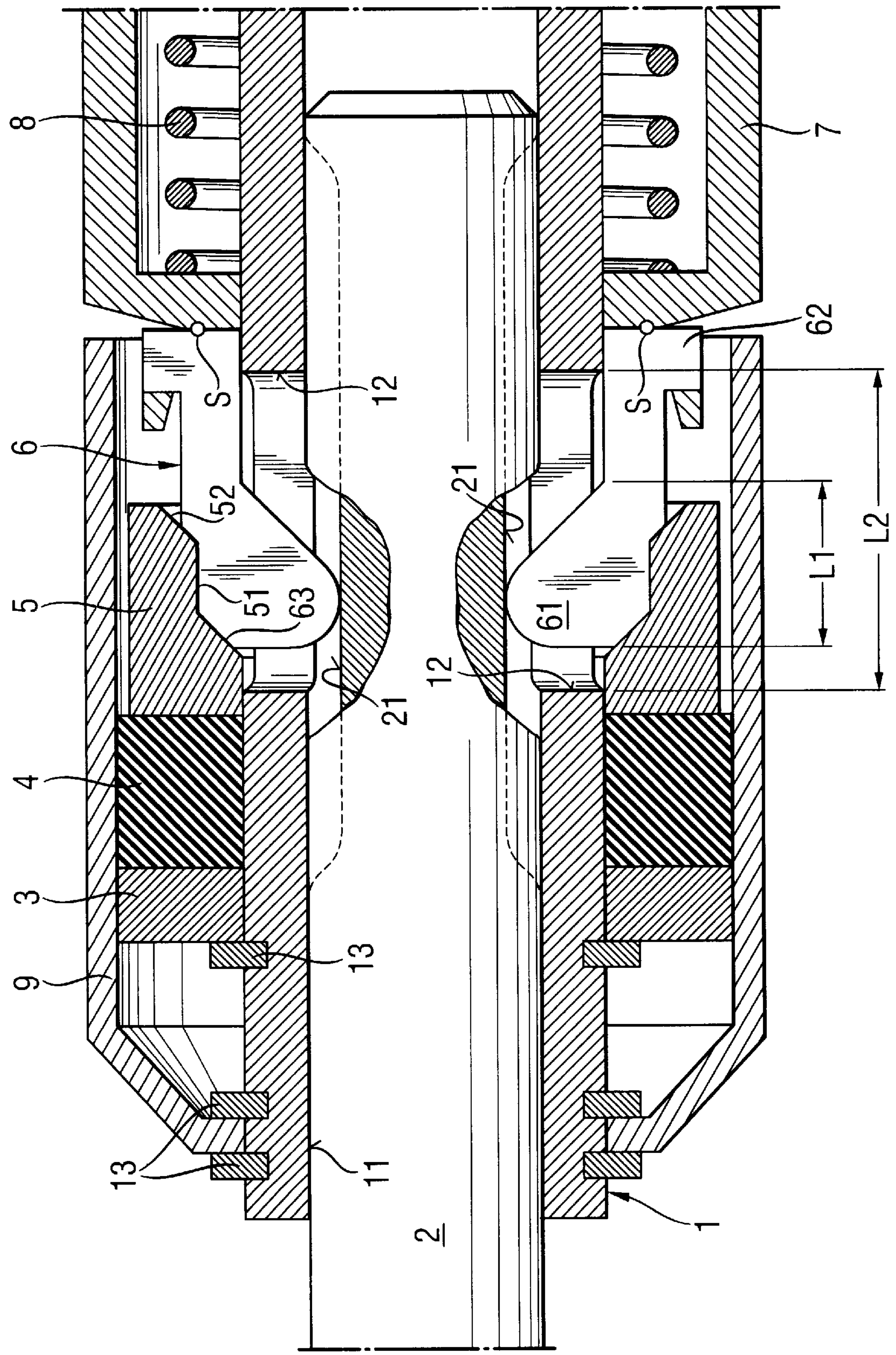
8
7
62
S
S
12
6
52
21
5
51
63
61
L1
L2
12
21
4
3
13
9
13
11
1
2

CHUCK FOR DRILLING AND CHISELING TOOLS

BACKGROUND OF THE INVENTION

1. Field of the Invention

The present invention relates to a chuck for drilling and chiseling tools and including a receiving sleeve having a central bore for receiving a tool shank and at least one through-opening formed in a sleeve wall, at least one locking member supported for a limited pivotal movement about a pivot axis, which extends substantially perpendicular to a longitudinal axis of the receiving sleeve, and projecting at least partially into the through-opening of the sleeve, with the locking member extending in its locking position, through the through-opening of the sleeve and into a receiving sleeve interior, a guide ring surrounding the receiving sleeve and at least partially overlapping the locking member from pivoting into its release position, and an actuation sleeve displaceable in a direction opposite to an operational direction of a tool against a spring-biasing force for enabling pivoting of the locking member into its release position.

2. Description of the Prior Art

A chuck of the type described above is disclosed, e.g., in German Utility Model DE-296 12 795 U1. The receiving sleeve of the disclosed chuck has a through-opening the length of which in a direction parallel to the longitudinal axis of the receiving sleeve is substantially equal to the length of the locking member measured likewise in the direction parallel to the longitudinal axis of the receiving sleeve. In order to provide for an unhindered pivotal movement of the locking member into and out of the interior of the guide ring, against which the locking member is radially supported, must be displaced, both upon the insertion and withdrawal of the working tool, in a direction opposite to the operational direction of the tool into a position enabling the unhindered pivotal movement of the locking member. The displacement of the guide ring is effected with the actuation sleeve, in which the guide ring is supported and which, to this end, is displaced in the direction opposite to the operational direction by a force applied to the actuation sleeve outside of the drilling or chiseling tool.

Because the actuation sleeve is biased into the operational direction by a compression spring, a drilling or chiseling tool operator should apply a manual force to displace the actuation sleeve against the spring-biasing force. With often replacement of the working tool, this requires a substantial expenditure of force by the operator, and the operator becomes rapidly tired.

Accordingly, an object of the present invention is to provide a chuck which would enable insertion of the working tool without first actuating the actuation sleeve. Another object of the invention is to provide a chuck the actuation sleeve of which is displaceable to a position, in which the unhindered pivotal movement of the locking member becomes possible, with a minimal expenditure of force.

SUMMARY OF THE INVENTION

These and other objects of the present invention, which will become apparent hereinafter, are achieved by providing a chuck in which the locking member is pivotally connected with the actuation sleeve.

In the chuck according to the present invention, the locking member is displaceable in the through-opening in the direction parallel to the longitudinal axis of the receiving sleeve. The locking member, which is connected with the actuation sleeve, is displaced, together with the actuation sleeve, in the direction opposite to the operational direction, upon the removal of the working tool from the chuck. In this way, the locking member moves out of the operational region of the guide ring into its release position, pivoting, in this position, outwardly about the pivot axis, which extends transverse to the longitudinal axis of the receiving sleeve, and therefore, does not project anymore into the interior of the receiving sleeve or into the elongate groove of the working tool shank.

For locking the working tool in the chuck and for proper radial positioning of the locking member, the locking member has a locking region extending into the through-opening formed in the wall of the receiving sleeve, and a connection region adjoining the locking region at a side of the locking region, which faces in the direction opposite to the operational direction of the tool and connectable with the actuation sleeve. In order to provide for displacement of the locking member in the direction opposite to the operational direction upon the insertion of the working tool into the chuck, the locking region has a maximum length in a direction parallel to a longitudinal axis of the receiving sleeve which is smaller than the length of the through-opening formed in the sleeve measured in the same direction. The length of the locking region corresponds, preferably, to from 0.3 to 0.8 of the length of the through-opening.

In order to protect the locking member and the end region of the elongate groove formed in the working tool shank and facing in the operational direction against any damage during an idle stroke of the drilling or chiseling tool, the guide ring is supported, in the operational direction, against, e.g., ring-shaped, elastic damping member. The elastic member damps axial blows which are transmitted to the locking member from the hammer mechanism of the drilling or chiseling tool by the shank of the working tool. To insure a more rapid and simple alignment of the shank in the chuck, upon insertion of the shank into the receiving sleeve, the receiving sleeve has two diametrically opposite through-openings, and the chuck includes two, likewise oppositely arranged, locking members.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS

Single FIGURE shows a chuck according to the present invention for a drilling and/or chiseling tool.

DETAILED DESCRIPTION OF THE PREFERRED EMBODIMENT

The drawing FIGURE shows a chuck according to the present invention which forms part of a chiseling tool (not shown). The inventive chuck is shown in its locking position. The chuck includes a receiving sleeve 1 having a central bore 11 into which a shank 2 of a drill or a chisel extends. Two diametrically opposite through-openings 12, which extend parallel to the longitudinal axis of the sleeve 1, are formed in the wall of the sleeve 1. The sleeve 1 is surrounded with a stop ring 3 and an elastic damping ring 4, which adjoins the stop ring 3 at its side facing in a direction opposite to the operational direction of the tool. The sleeve 1 is further surrounded with a guide ring 5 adjoining the damping ring 4. The stop ring 3 is secured against an axial displacement at least in the operational direction of the tool. The guide ring 5 cooperates with two diametrically opposite locking members 6. The guide ring 5 has an inwardly directed stop surface 51 with which the guide ring 5 holds the locking members 6 in their locking position in which the locking members project through the through-openings 12, which are formed in the wall of the sleeve 1, and extend into two diametrically opposite, axially closed elongate grooves 21 which are formed in the shank 2 of the drill or chisel. Each locking member 6 has a locking region 61 having a length L1, and a stop region 62 which adjoins the locking region 61. Because the length L1 of the locking region 61 is smaller than the length L2 of the through-opening 12 which is formed in the wall of the sleeve, the locking member 6 is capable of a limited axial displacement in the locking position of the chuck. The length L1 of the locking region 61 of the locking members 6 corresponds approximately to 0.5 of the length L2 of the through-opening 12.

Each of the locking members 6 is connected with an actuation sleeve 7, which adjoins the locking member 6 at a side of the locking member 6 facing in the direction opposite to the operational direction of the tool. The locking member 6 is mounted with a possibility of pivotal movement relative to the actuation sleeve 7 about a pivot axis 5 which extends transverse to the longitudinal axis of the sleeve 1. In order to provide for displacement of the locking member 6 from its locking position, in which it is held by the stop surface 51 of the guide sleeve 5, into its release position, the actuating ring 7 is displaceable in the direction opposite to the operational direction of the tool against a biasing force of spring 8. A cover sleeve 9 surrounds the front, in the operational direction, region of the receiving sleeve 1 and extends over the stop ring 3, the damping ring 4, the guide sleeve 5, and the locking members 6. The cover sleeve 9 is axially secured with respect to the sleeve 1 by two retaining rings 13.

Upon insertion of a tool shank 2 into the chuck, the locking members 6, together with the actuation sleeve 7, are pushed out of the operational region of the guide ring 5. Upon being pushed backward, the locking member 6 pivot into their release position, enabling further movement of the shank 2 into the opening of the receiving sleeve 1. However, as the shank 2 is displaced to a position in the chuck in which the locking members 6 overlaps the axially closed grooves 21 of the chuck, the actuation sleeve 7 is biased by the spring 8 into a direction toward the guide sleeve 5, pushing the locking members 6 toward the guide ring 5. The guide ring 5 and the locking members 6 have cooperating guide surfaces 52 and 63, respectively, which provide for a pivotal movement of the locking members 6 into their locking position. Thus, insertion of a tool shank into the chuck without the need to first displace the actuation sleeve 7, is possible.

Though the present invention was shown and described with references to the preferred embodiment, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A chuck for drilling and chiseling tools, comprising a receiving sleeve (1) having a central bore for receiving a tool shank (2) and at least one through-opening (12) formed in a sleeve wall; at least one locking member (6) supported for a limited pivotal movement about a pivot axis, which extends substantially perpendicular to a longitudinal axis of the receiving sleeve, and projecting at least partially into the through-opening (12) of the receiving sleeve (1), the locking member (6) extending, in a locking position thereof, through the through-opening (12) of the receiving sleeve (1) and into a receiving sleeve interior; a guide ring (5) surrounding the receiving sleeve (1) and at least partially overlapping the locking member (6) in the locking position thereof, preventing the locking member (6) from pivoting into a release position thereof; and an actuation sleeve (7) displaceable in a direction opposite to an operational direction of the tool against a spring-biasing force for enabling pivoting of the locking member (6) into the release position thereof, the locking member (6) being pivotally connected with the actuation sleeve (7).

2. A chuck as set forth in claim 1, wherein the locking member (6) has a locking region (61) extending into the through-opening (12) formed in the wall of the receiving sleeve (1), and a connection region (62) adjoining the locking region (61) at a side of the locking region, which faces in the direction opposite to the operational direction of the tool and connectable with the actuation sleeve (7).

3. A chuck as set forth in claim 2, wherein the locking region (61) has a maximum length (L1) in a direction parallel to a longitudinal axis of the receiving sleeve (1) and which is smaller than a length (L2) of the through-opening (12) formed in the receiving sleeve (1) in the direction parallel to the longitudinal axis of the receiving sleeve (1).

4. A chuck as set forth in claim 3 wherein the length of the locking region (61) of the locking member (6) corresponds to from 0.3 to 0.8 of the length L2 of the through-opening (12) of the receiving sleeve (1).

5. A chuck as set forth in claim 1, further comprising an elastic damping ring (4) against which the guide ring (5) is supported in the operational direction.

6. A chuck as set forth in claim 1, wherein the receiving sleeve (1) has two diametrically opposite through-openings (12) formed in the receiving sleeve wall, and the chuck comprises two locking members (6) extendable into the two through-openings.

* * * * *